US00RE40580E

(19) United States
(12) Reissued Patent
Mitvalsky

(10) Patent Number: US RE40,580 E
(45) Date of Reissued Patent: Nov. 25, 2008

(54) TOY FIGURE SIMULATING A JUMP SHOT

(76) Inventor: Vlad Mitvalsky, 4248 Spencer St., Torrance, CA (US) 90503

(21) Appl. No.: 11/825,835

(22) Filed: Jul. 10, 2007

Related U.S. Patent Documents

Reissue of:
(64) Patent No.: 7,222,859
Issued: May 29, 2007
Appl. No.: 11/120,280
Filed: May 3, 2005

(51) Int. Cl.
*A63F 7/20* (2006.01)

(52) U.S. Cl. ..... 273/317.3; 273/317.1

(58) Field of Classification Search ..... 273/317.3, 273/317.1, 317, 108.21, 118, 119, 243, 244, 273/146, 259, 277; 446/139, 308, 309, 330
See application file for complete search history.

(56) References Cited

U.S. PATENT DOCUMENTS

| | | | |
|---|---|---|---|
| 731,850 | A | 6/1903 | Bradbury |
| 1,433,335 | A | 10/1922 | Bensch |
| 1,612,699 | A | 12/1926 | Cole |
| 1,982,491 | A | 11/1934 | Bamum |
| 2,203,990 | A | 6/1940 | Heymer |
| 2,627,700 | A | 2/1953 | Weiss |
| 2,799,501 | A | 7/1957 | Barbolla |
| 2,827,035 | A | 3/1958 | Modica, Jr. |
| 2,878,801 | A | 3/1959 | Patchin et al. |
| 2,911,758 | A | 11/1959 | Carson |
| 3,074,720 | A | 1/1963 | Carver et al. |
| 4,085,540 | A | 4/1978 | Jernstrom et al. |
| 5,690,330 | A | 11/1997 | Ozawa |
| 5,788,242 | A | 8/1998 | Rudell |
| 5,851,012 | A | 12/1998 | Langieri et al. |
| 6,171,169 | B1 | 1/2001 | Saunders |
| 6,837,769 | B1 | 1/2005 | Skov et al. |

*Primary Examiner*—Mitra Aryanpour

(57) ABSTRACT

An easy to manufacture toy figure (10) for throwing balls or other aerial projectiles by emulating a jump shot in simulated games such as basketball. Resilient means (12) may be bent or compressed and then released to rebound substantially to their original form and position with speed sufficient to throw an aerial projectile (15) placed upon a body of animate shape (13) linked or attached directly or via said resilient means to supporting base (11). Said resilient means may be provided by a coil, leaf or other type of spring, or by a resilient or elastic material forming a part of the body or the base. Said animate body (13) may be designed to resemble popular ballplayers or imaginary animate shapes for marketing purposes, including player numbers on club color uniforms, with fixed or rotatable arms.

15 Claims, 4 Drawing Sheets

TOY FIGURE SIMULATING A JUMP SHOT

Matter enclosed in heavy brackets [ ] appears in the original patent but forms no part of this reissue specification; matter printed in italics indicates the additions made by reissue.

CROSS-REFERENCE TO RELATED APPLICATIONS

This application is related to the utility patent application Ser. No. 10/384,515, filed Mar. 7, 2003, now abandoned.

STATEMENT REGARDING FEDERALLY SPONSORED RESEARCH

Not applicable.

SEQUENCE LISTINGS

Not applicable.

BACKGROUND OF THE INVENTION

Various types of simulated games using an aerial projectile, popular with children and adults alike, are known in the art. The projectile is usually propelled by a simple catapult or a spring launcher, which sometimes replace a simulated ballplayer figure at the time of shooting the projectile toward a goal. Neither the launchers nor their substitution for a player figure at a critical point in the game simulate the reality very convincingly. While figures used in simulated games using a surface projectile often mimic the live action fairly well, figures devised for games using an aerial projectile, such as basketball, were so far much less successful.

Many simulated game inventions propose a catapult or a launcher: U.S. Pat. No. 5,788,242 (Rudell et al., 1998) shows a TWO SIDED BASKETBALL GAME with two simple launchers. U.S. Pat. No. 2,878,801 to Patchin et al. (1959) discloses a vertical TOY CATAPULT DEVICE with a horizontal support for rectangular projectiles. U.S. Pat. No. 2,203,990 to R. J. Haynur (1940) proposes a multiplayer GAME APPARATUS using a molded spring launcher and a projectile with parallel faces indicating a play board position for the next player. U.S. Pat. No. 1,612,699 to C. de V. Cole (1926) for a BASKET-BALL GAME has multiple player pieces, moving to random positions on the play board determined by a roll of dice, replaced for attempts at scoring by a catapult resembling an artillery piece. U.S. Pat. No. 731,850 to R. S. Bradbury (1903) discloses a GAME whereby a blade-spring launcher shoots a ball toward multiple baskets.

LEGO Sports sells HUMAN-LIKE TOY FIGURES based on U.S. Pat. No. 6,837,769 to Skov et al. (2005) with a coil spring connecting torso to its legs part, allowing the figure to 'chest-slam' a ball. U.S. Pat. No. 6,171,169 to Saunders (2001) discloses an ARTICULATED TOY FIGURE SIMULATING BASKET-BALL PLAY using a spring-loaded mechanism with a trigger and latch to swing an arm forward and downward, flinging a ball toward a basket. U.S. Pat. No. 2,911,758 to F. D. Carson uses a human figure shaped BALL CATAPULTING DEVICE with arms propelled by an elastic strip pulled crank to throw balls either upward from around its knees, or overhead backwards. U.S. Pat. No. 1,433,335 to K. Bensch (1922) discloses a BASKET-BALL TOY using figures with spring-loaded arms holding a cup, pulled by strings to shoot a ball. Probably the most realistically acting prior art figure is disclosed in U.S. Pat. No. 5,690,330 to Ozawa (1997.) It shows a TOY BASKETBALL GAME WITH SELF-JUMPING PLAYER ejected from a stationary base and releasing the ball on contact with the basket rim, simulating a so-called 'slam dunk.' None of the known figures simulates a player executing a jump shot or a hook shot, perhaps the most common shooting actions in basketball, handball and other games using an aerial projectile.

BRIEF SUMMARY OF THE INVENTION

Accordingly, the present invention provides an easy to manufacture and inexpensive toy figure simulating a jump shot, a hook shot and a ball pass for simulated games using aerial projectiles, such as basketball and others. Several objects and advantages of the present invention are to provide such toy figure, more particularly:

1. to provide a toy figure throwing serial projectiles using the energy supplied by resilient means in the form of a coil, leaf or other type of spring, or the energy of a resilient or elastic material forming a part of the figure or of its supporting base, said toy figure having either fixed or rotatable arms;
2. to provide said toy figure that may be made or decorated for marketing purposes to resemble real-life ballplayers including club uniforms, or animals, imaginary literary, movie and other characters; and
3. to provide a method of playing a simulated basketball game using at least one said toy figure, where the figures in a game may be either all of the same type or the various designs described in the present invention can be used for different game positions.

Further objects and advantages of the present invention will become apparent from a consideration of the ensuing description and drawings.

BRIEF DESCRIPTION OF THE SEVERAL VIEWS OF THE DRAWING

In the drawings, closely related figures or parts have the same number but different alphabetic suffixes.

FIGS. 1A, 1B, and 5.

FIG. 5 presents a 'executive toy' version with a ball shooting hand on a leaf spring.

Reference numerals in drawings

| | | | |
|---|---|---|---|
| 10, 85 | Toy figure | 11, 21, 31, 41, 51, 61, 71 | Base |
| 11p | Posts housing the axle 19 | 12, 52 | Leaf spring |
| 12a | Leaf spring - deformed | 12b | Rigid platform |
| 12d | Torsion coil spring | 12c, 12f, 42, 62, 72 | Compression coil spring |
| 12e, 22 | Curved leaf spring | 13, 23, 33, 43a, 63, 73 | Body |
| 14, 24, 44 | Arms and Hands | 15, 25, 35, 45, 55, 65 | Ball or aerial projectile |
| 16, 37 | Connecting means: string | 17, 39 | Pin |
| 18, 34 | Forearm and hand | 19 | Axle |
| 20, 27, 74, 75 | Anchoring means | 26, 83 | Directional marks |
| | | 32 | Tension coil spring |
| 36 | Elbow pivot | 32b | Coil spring: bent lower |
| 32a | Coil spring: bent upper | 38 | Arm elbow |
| | | 43b | Compression flange |
| 32c | As 32b, pushed down | 47 | Connecting means: shaft |
| | | 49a | Upper pin |
| 40, 64 | Flange | 54 | Hand |
| 46 | Arm pivot | 81 | Play board |
| 48 | Link | 84 | Basket, backboard, |
| 49b | Lower pin | | |
| 66 | Resilient material | | |
| 82 | Positional marks | | |

DETAILED DESCRIPTION OF THE INVENTION

Figure 1A:
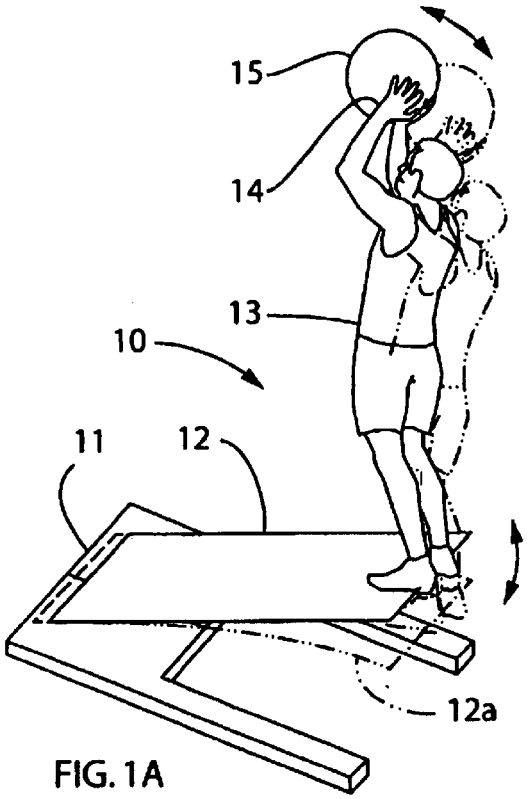
FIG. 1A shows a toy figure with fixed arms, energized by a leaf spring inclined from horizontal.

FIGS. 1A—A Preferred Embodiment

FIG. 1A shows a preferred embodiment of my invention—a toy FIG. 10 simulating jump-shooting and ball passing in games using aerial projectiles. Said toy figure comprises a base 11, resilient means in the form of a leaf spring 12, and a body 13 in the shape of a ballplayer. Base 11 has a flat bottom surface large enough to provide stability. Spring 12 is attached toward one edge of base 11 and rising in a sharp angle to the horizontal plane over the center of said base, also for stability reasons. Body 13 is coupled to the opposite end of spring 12. Arms and hands 14 of the figure are fixed in a typical raised jump-shooting position. A ball or other aerial projectile 15 is placed upon hands 14 formed to carry it. Base 11 and body 13 including arms and hands 14 are preferably cast of a plastic or metal material or a suitable equivalent, and are attached to spring 12 by any appropriate anchoring means like glue, screws or other comparable method or cast directly around the spring as shown here. Spring 12 is formed of at least one substantially flat piece of a resilient plastic, metal or other material strong enough to withstand repeated flexing and to impart enough force to propel the projectile 15. The material, length, thickness and shape of the leaves, and angle of the spring will affect the trajectory of the projectile, as will the weight of the projectile and other factors. The projectile 15 may be made to the requirements of any particular purpose.

Operation of a Preferred Embodiment

A user places said toy FIG. 10 on a suitable surface such as a play board with court markings and positional or directional indicia. Directional marks can be used to orient the figure toward a target. The user places ball 15 upon hands 14 and bends down spring 12 as indicated by phantom lines 12a, estimating the force necessary to shoot ball 15 a desired distance. When spring 12 is released, it rebounds to its original position, carrying body 13, hands 14 and ball 15 upward and forward on a curve. At the highest point of the curve the ball 15 is thrown in an arc indicated by the upper arrow.

Other Embodiments

Figure 1B:
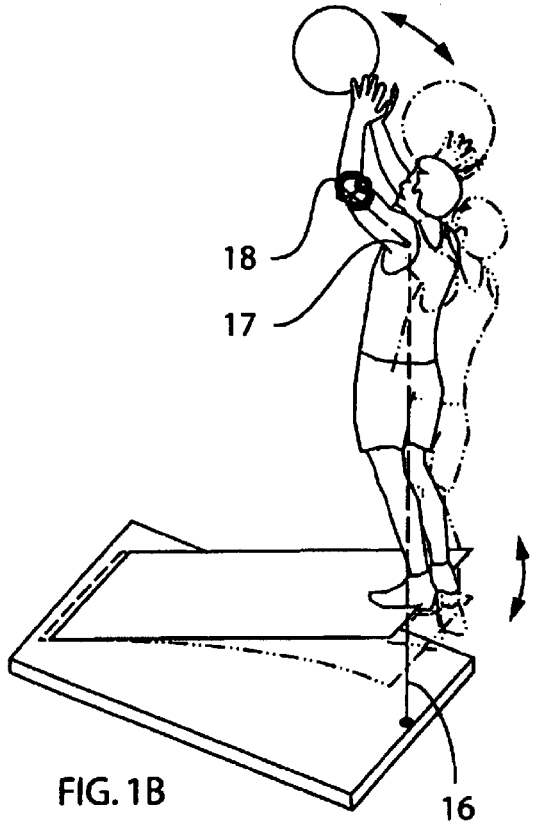
FIG. 1B shows a similar figure with rotatable arms and connecting means to rotate them.
Figure 1C:
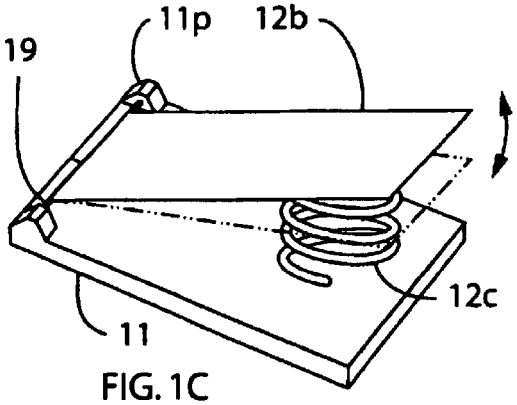
FIGS. 1C to 1E show various kinds of resilient means for use with e.g.
Figure 1E:
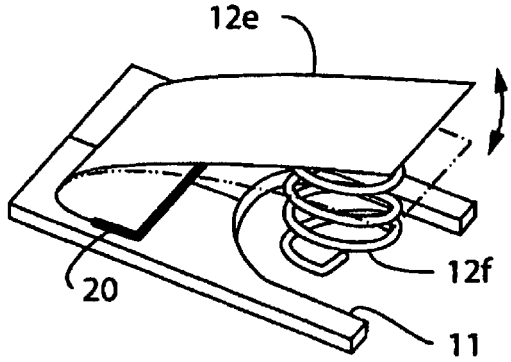
Figure 1D:
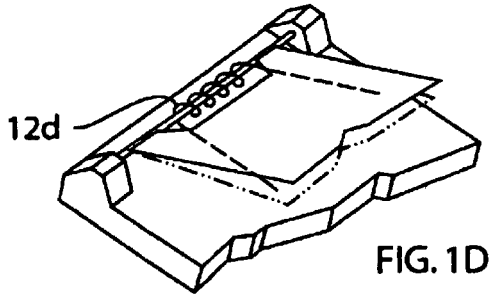

FIGS. 1B to 1E offer some variations of the preferred embodiment: FIG. 1B shows a way of adding rotatable forearms 18, here using a string 16 and pin 17 in a way described below in FIG. 3. In FIG. 1C the leaf spring is replaced by a compression coil spring 12c together with a rigid platform 12b rotating around axle 19 terminated in posts 11p. It is preferable to combine the up-down movement of a substantially vertical coil spring with the rotation of the platform (or of the arms, like in FIGS. 3 and 4) to better simulate the action of a ballplayer jumping up and pushing a ball away (shooting) at the same time, while a leaf spring simulates it well by itself since its free end moves on a complex curve. The spring ends and/or the axle may be anchored to the platform, the base or both by various means. FIG. 1D shows a similar platform energized by a torsion coil spring 12d wound around axle 19, with one end of the spring supporting the platform and the other end pressing against the base. FIG. 1E shows four other variations combined: (a) a curved leaf spring 12e attached to base 11 by (b) anchoring means 20 (glue, weld, screw, pin, a groove etc.) can be (c) combined with another spring, here a compression coil spring 12f springing (d) not against the base, but against the surface carrying the toy figure.

Figure 2:
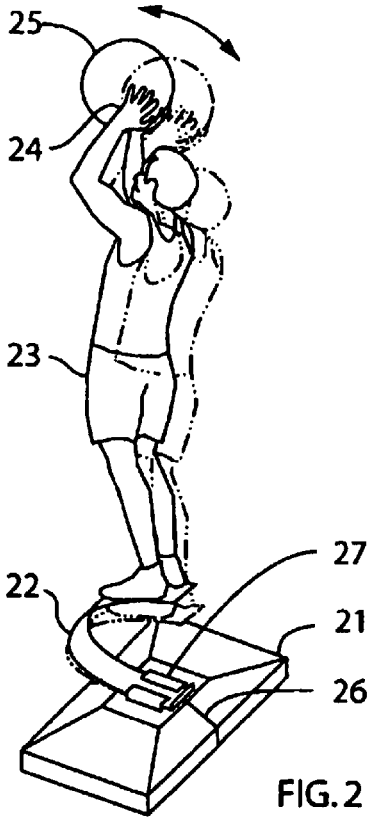
FIG. 2 presents a similar figure with a curved leaf spring.

FIG. 2 presents a similar toy figure with a curved leaf spring 22 attached to base 21 by anchoring means 27 and glued to body 23 carrying ball 25 placed onto hands 24. To shoot, a user bends spring 22 downward as indicated by phantom lines, while holding the base. When the spring is released, the ball will be thrown on a short, steep shooting arc. This type of toy figure may be positioned near basket in a simulated basketball game, shooting the ball in a way resembling the action of a center or a forward. Arms and hands may be formed to simulate a hook shot, with one arm blocking opponents while the other arm throws ball in a high overhead arc. Directional marks 26 may be placed on the base 21.

Figure 3:
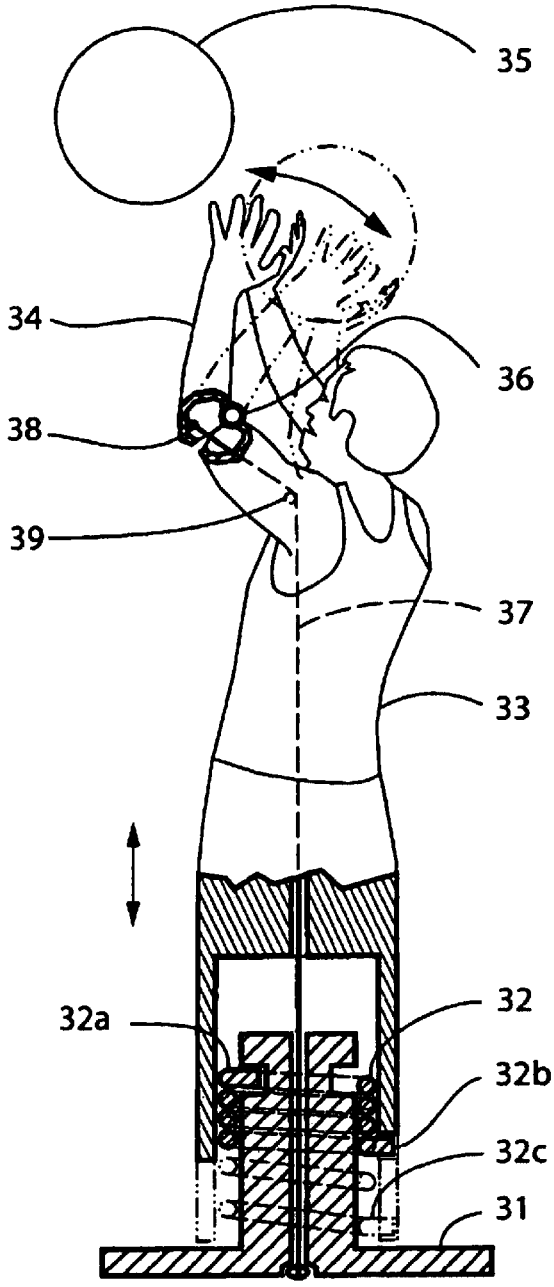
FIG. 3 shows another toy figure using a tension coil spring, with forearms rotated forward by a string.

FIG. 3 shows a partially sectioned view of another type of the figure. Tension coil spring 32 is anchored by its bent upper end 32a to base 31 and by its bent lower end 32b to body 33 (anchoring means and resilient means are identical.) Each forearm and hand 34 is attached rotatably to the body at an elbow pivot 36. Connecting means (string 37) is attached at one end to base 31, goes through a cavity in body 33 around a pin 39 located in the shoulder area, and attaches to one forearm and hand 34 at elbow 38.

Figure 4:
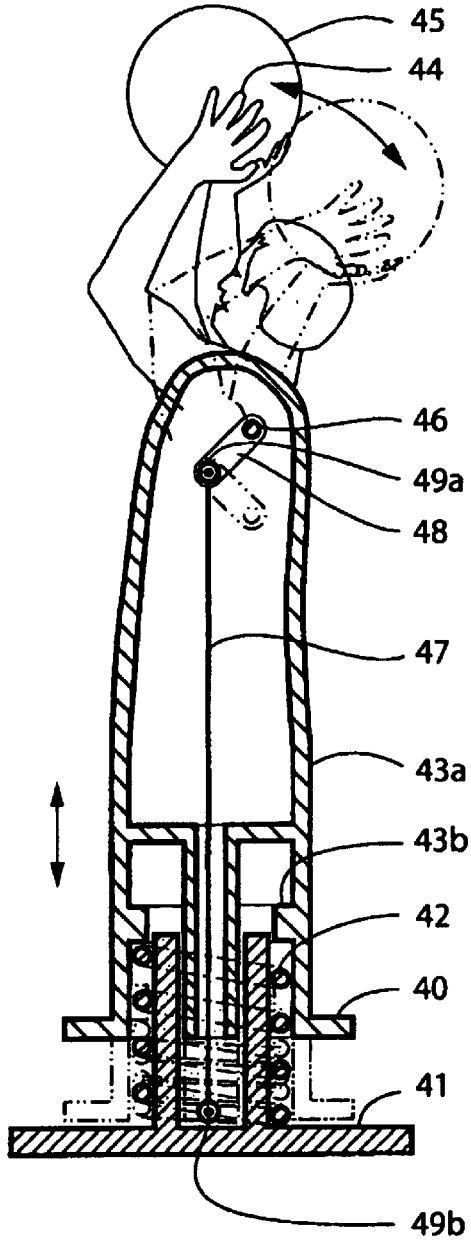
FIG. 4 shows a similar toy figure with a compression coil spring and arms rotated by a shaft.

FIG. 4: the toy figure uses a compression coil spring 42 deformable between a compression flange 43b and base 41. Arms and hands 44 rotate around an arm pivot 46 joining them through a hollow body 43 within shoulder area. A shaft 47 is attached to said arm pivot 46 by an upper pin 49a and link 48, and to base 41 by a lower pin 49b; together they form the connecting means (here identical to anchoring means.) An optional flange 40 provides an easier hold for pushing down body 43. Rack and pinion assembly could be also used to translate the vertical movement of the body into the rotation of the arms.

FIGS. 3 and 4 operate in a similar way (numbers for FIG. 4 are in parentheses): the user presses down body 33 (43) deforming coil spring 32 (42) while steadying base 31 (41,) using flange 40 of provided. After forearms and hands 34 (arms and hands 44) rotate to a lower position indicated by phantom lines, the user places a ball 35 (45) upon the hands. When body 33 (43) is released, spring 32 (42) forces the body upward while string 37 (shaft 47) force forearms 34 (arms 44) to rotate forward. The combined motion pushes ball 35 (45) upward and forward in an arc indicated by the upper arrows. At the top of the arc the ball 35 (45) is thrown toward a goal. Both bodies 33 and 43 are preferably cast of a plastic or metal material or a suitable equivalent, with a cavity for connecting means. Rotatable arms or forearms including hands are preferably cast of the same material as the body, and attached to the body by said pivot 36 (46). Said coil spring 32 (42) is formed preferably of a spring metal wire capable of providing enough force to throw the ball without being too difficult to deform by an intended group of users. Shaft 47, link 48, pins 39, 49a and 49b are preferably made of metal for strength and wear resistance.

Figure 5:
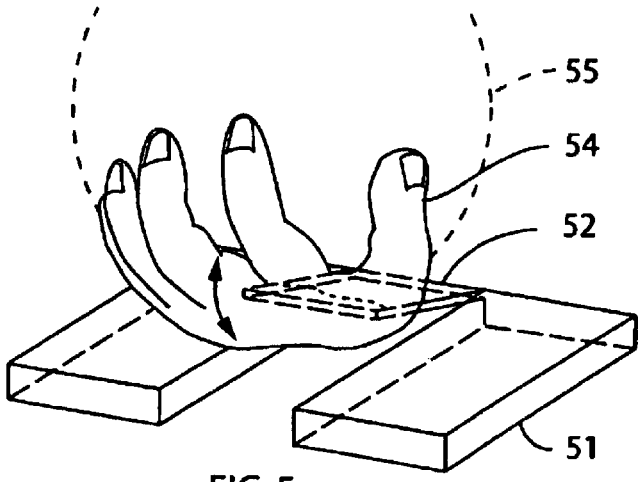

FIG. 5 shows an 'executive toy' similar in function to FIG. 1. A hand 54 replaces the ballplayer shaped body 13 of FIG. 1. Base 51, a leaf spring 52 and hand 54 can be all formed together of a clear, black or otherwise colored plastic material or metal, or made of a combination of materials. Spring 52 should be resilient enough to impart sufficient momentum to a ball 55. A basket with a backward and a stand formed from a similar material may also be provided. Instead of one hand 54, a pair of hands may be used. The spring can be replaced by any of the many possibilities suggested in FIGS. 1C to 1E.

Figure 6:
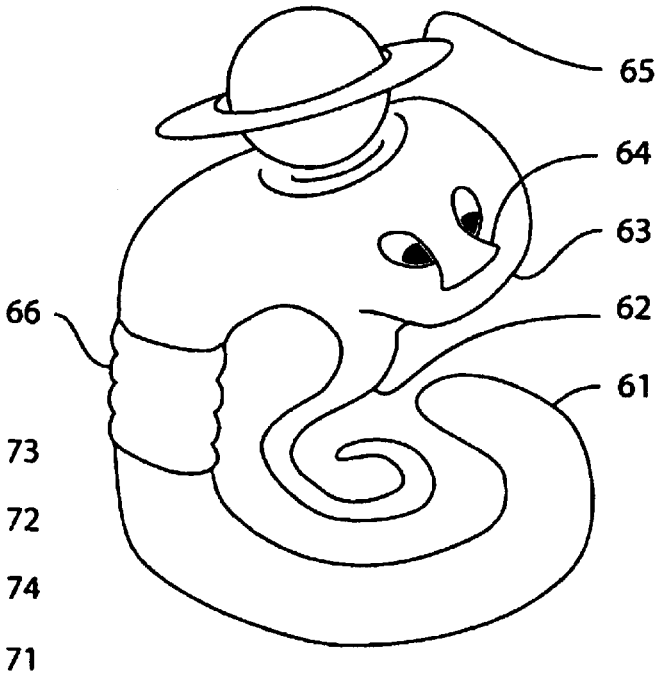
FIG. 6 shows a unified figure where resilient means= tentacle spring+resilient material of body section.

FIG. 6 shows one of the less obvious variants—a unified figurine of an imaginary creature resting on its tail/base 61 and using a two-part resilient means: (1) resilient material 66 forming a part of body 63 additionally energized by (2) twisted appendage 62 (a disguised coil or curved leaf spring) forming together said resilient means supplying energy to toss a planet (aerial projectile 65.) A flange 64 (the 'nose') is pressed to deform the two-part resilient means (62 and 66) supplying the tossing energy.

Figure 7:
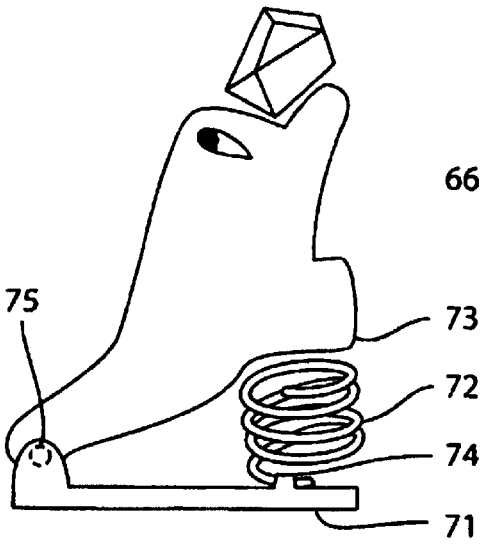
FIG. 7 shows a toy figure with both body and resilient means linked to the base.

FIG. 7 presents a toy figure where both body 73 and resilient means (compression coil spring 72) are anchored to base 71, each by different anchoring means 74 and 75.

FIGS. 1 to 7 show only a small number of the many possible arrangements of these basic components:

- body of animate shape (including fixed or rotatable extensions, e.g. arms, tentacles),
- base, and
- resilient means (various leaf, coil and other springs, resilient material, or combinations thereof;
- linked together in various order by anchoring means limiting the movement of said body to correspond to the deformation of the resilient means. Said anchoring means can be either physically separate (which can be fixed like glue 20, screws etc., or with at least one degree of freedom such as axle 19 and rigid platform 12b, pins, joints etc.), or identical to any of the first three components (e.g. casting around the resilient means in FIG. 1a, spring ends 32a/32b, all linked into one unit in FIG. 6, notches or bumps on one fitting into indentations in another etc.), and
- supplemented, when desired, by connecting means for rotating an extension of said body, such as an arm or tentacle supporting chosen projectile(s), to aid throwing the projectiles.

Even the connecting means and anchoring means can be identical (e.g. string 37 or shaft 47.)

Figure 8:
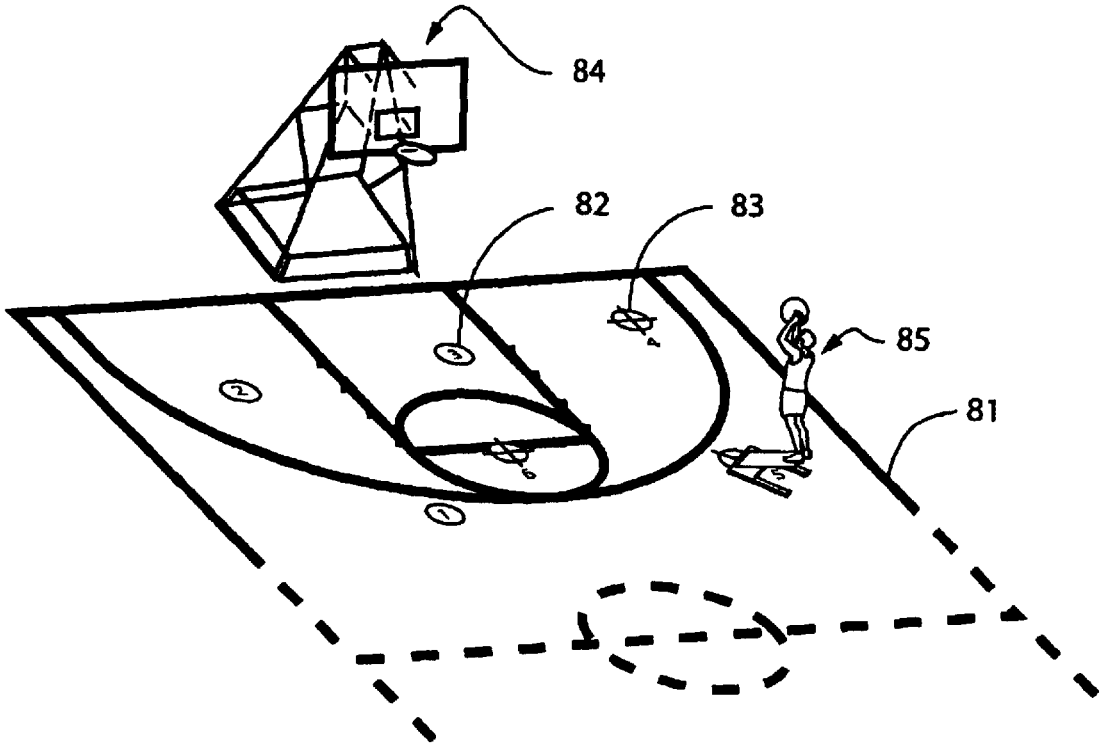
FIG. 8 shows a version of a tabletop basketball game using the toy figures in FIGS. 1 through 4.

FIG. 8 describes a version of a tabletop play board 81 for a simulated basketball game using the toy figures simulating a jump shot or a hook shot described in FIGS. 1 through 6. The board 81 can have either half-court game markings and one basket, backboard and stand assembly 84, or full-court markings partially indicated by dashed lines, with two basket assemblies on opposite ends of board 81. The game can use one toy figure of present invention 85 or a plurality of them per team, using either one type of figure or different designs for different positions. For example, the toy figure of FIG. 1 could be used for both guard positions while toy figures shown in FIGS. 2, 3 or 4 would be placed in forward and center positions, one of them based on FIG. 2 simulating a hook shot. The toy figure(s) 85 are placed on positional marks 82 which may be replaced by directional marks 83 as shown in positions number 4, 5 (under the toy FIG. 85) and 6 on the board 81. Directional marks 83 pointing to the center of the basket should be supplemented by matching directional marks 26 as shown on the toy figure in FIG. 2. The positional and directional indicia could be variously combined on different sides of board 81, for example to balance different skill levels of users. The game starts with a draw or a roll of standard dice to decide which user should start—the highest or the lowest roll starts the game as agreed by users. If only one toy FIG. 85 is used per side, the starting user puts it on the marks 82 or 83 corresponding to the number on the dice. If 2 or more FIGS. 85 are used per side (5 as in the real game of basketball etc.,) the user passes a ball to the figure place in the corresponding position before starting the game. Rolling number 6 on the dice could result in a foul shot from position number 6, or optionally in losing the turn to the next user. Users can take turns rolling the dice and shooting the ball, or can use the dice described in FIG. 7 to determine the action to be taken next. Score can be kept according to the usual basketball rules with one, two or three points per shot. A game ends in any way agreed on—a time limit, certain score reached etc.

Figure 9:
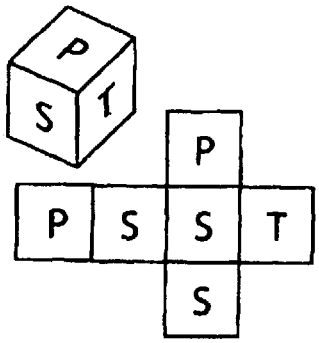
FIG. 9 shows a version of dice used to randomly select the next game action.

FIG. 9 shows a variant of an action die for random determination of the next action to be taken by a user. If a user rolls P (Pass), the ball shall pass to a position optionally determined by a roll of a standard die indicating positions 1 through 6. User that rolls S (Shoot) may attempt shooting at the goal from the position possessing the ball. Rolling T (Turn-over) means the loss of the ball to the next user. The 32S-2P-1T probabilities indicated in FIG. 9 can be of course modified.

CONCLUSION, RAMIFICATIONS, AND SCOPE

Accordingly, the reader will see that the toy figures of the present invention simulate more realistically the jump shot or hook shot action of such aerial projectile games as simulated basketball and others. The toy figures are inexpensive to manufacture and can be shaped and decorated to resemble popular live ballplayers and their game uniforms, animals, literary or other personages and other real or imaginary characters providing various marketing opportunities.

While the above description contains specific embodiments of the invention, these should not be construed as limitations on the scope of the invention. Many modifications obvious to those skilled in the art may be made without departing from the spirit of the invention. For example, the toy figure body can be oriented sideways with one tentacle formed to shoot a so-called hook shot; the leaf spring can be variously shaped to generate different ball trajectories; a rack and pinion assembly can be used as connecting means in place of a string 37 or shaft 47 to rotate the arms; a spring type from one embodiment can be combined with an arm assembly from another; the body can be cast either solid or hollow or hand-carved from an exotic wood in any animate shape, such as an imaginary extraterrestrial being tossing a medium size galaxy and so on.

Therefore, the scope of the invention should be determined by the appended claims and their legal equivalents.

I claim:

1. A toy figure for throwing aerial projectiles by simulating a jump shot, comprising:

a. a base of sufficient size to provide stability;

b. resilient means deformable essentially vertically for supplying energy to throw the projectiles;

c. a body of animate shape urged by said resilient means to jump up while said resilient means is rebounding substantially to its original position and shape after having been deformed;

d. anchoring means to joining said body movably to said base so as to limit the movement of said body to substantially correspond to the deformations of said resilient means;

e. at least one upper limb attached pivotally to said body, said upper limb being formed to support and launch the projectiles; and f. connecting means for rotating said upper limb by translating an essentially vertical movement of said body relative to said base so as to add a horizontal vector to the projectile flight, whereby a realistic simulation of a jump shot is obtained by placing at least one aerial projectile upon said upper limb, deforming and then releasing said resilient means to propel the projectiles to fly off said upper limb.

2. The toy figure of claim 1 wherein said body is formed to resemble at least one hand shaped to support and throw the projectile.

3. The toy figure of claim 1 wherein said body is formed and decorated to resemble a real or imaginary personage.

4. The toy figure of claim 1 wherein said resilient means is a leaf spring comprising essentially at least one flat or curved leaf.

5. The toy figure of claim 1 wherein said resilient means is a coil spring of a tension, compression, or torsion type.

6. The toy figure of claim 1 wherein said resilient means is the material forming a section of said base or said body.

7. The toy figure of claim 1 wherein said toy figure is outwardly uniform, wherein parts of the figure perform the functions of said body, said base and said resilient means.

8. The toy figure of claim 1 wherein said resilient means and said anchoring means are identical.

9. The toy figure of claim 1 wherein said anchoring means is a direct movable attachment between said body and said base.

10. The toy figure of claim 1 wherein said connecting means and said anchoring means are identical.

11. A toy figure for throwing aerial projectiles by simulating a jump shot, comprising:

a. a base of sufficient size to provide stability;

b. a body of animate shape having at least one [fixed upper] limb formed to support and throw aerial projectiles; and c. a leaf spring comprising essentially at least one flat or curved leaf attached at or toward one edge to said body and at or toward another edge to said base so as to simulate a jump shot by rebounding, after having been deformed, together with said body substantially to their original shape and position with sufficient speed and momentum to throw aerial projectiles placed upon said body, whereby a realistic simulation of a jump shot is obtained by placing at least one aerial projectile upon said body, deforming and then releasing said resilient means to propel the projectiles to fly off said body.

12. The toy figure of claim 11 wherein said body is formed to resemble at least one hand shaped to support and throw the projectile.

13. The toy figure of claim 11 wherein said body is formed and decorated to resemble a known ballplayer.

14. A toy figure for throwing aerial projectiles by simulating a jump shot, comprising:

a. a base of sufficient size to provide stability;

b. a body of animate shape having at least one [fixed upper] limb formed to support and launch aerial projectiles;

c. resilient means interposed between said body and an element selected from the group consisting of said base and a surface said base is resting on, so as to supply energy to said body for throwing the projectiles by urging said body to jump up; and d. anchoring means for linking pivotally said body and said base so as to add a horizontal vector to the movement of said body and limit the movement of said body to substantially correspond to the deformations of said resilient means, whereby a realistic simulation of a jump shot is obtained by placing at least one aerial projectile upon said body, deforming and then releasing said resilient means to give impetus to said body to throw the projectile.

15. The toy figure of claim 14 wherein said body is formed and decorated to resemble a real or imaginary personage.

* * * * *